(12) United States Patent
Frost et al.

(10) Patent No.: US 8,702,994 B2
(45) Date of Patent: Apr. 22, 2014

(54) SODIUM NITRITE OXIDATION OF HYDROGEN SULFIDE

(75) Inventors: Jack G. Frost, Duncan, OK (US); Kenneth J. Snyder, Jr., Addington, OK (US)

(73) Assignee: United Laboratories International, LLC, Houston, TX (US)

( * ) Notice: Subject to any disclaimer, the term of this patent is extended or adjusted under 35 U.S.C. 154(b) by 916 days.

(21) Appl. No.: 12/415,283

(22) Filed: Mar. 31, 2009

(65) Prior Publication Data

US 2010/0243578 A1 Sep. 30, 2010

(51) Int. Cl.
*C02F 1/66* (2006.01)
*C02F 1/72* (2006.01)

(52) U.S. Cl.
USPC ......... 210/750; 210/758; 423/514; 423/573.1

(58) Field of Classification Search
USPC .......... 210/750, 758; 423/220, 223, 232, 514, 423/567.1, 571, 573.1
See application file for complete search history.

(56) References Cited

U.S. PATENT DOCUMENTS

| 3,754,376 | A | * | 8/1973 | Kent | 95/258 |
| 3,821,110 | A | * | 6/1974 | Luetzelschwab | 210/750 |
| 4,454,101 | A | * | 6/1984 | Garrison et al. | 210/702 |
| 4,515,759 | A | * | 5/1985 | Burnes et al. | 423/232 |
| 4,681,687 | A | * | 7/1987 | Mouche et al. | 210/764 |
| 4,880,609 | A | * | 11/1989 | Naraghi | 423/226 |

OTHER PUBLICATIONS

Mahmood et al., "Effect of Nitrite to Sulfide Ratios on the Performance of Anoxic Sulfide Oxidizing Reactor," The Arabian Journal for Science and Engineering, Jan. 2009, V. 34, No. 1A, pp. 45-54.*
Garcia, John, Nalco, "Sulfa-Check Hydrogen Sulfide Abatement", Crude Oil Quality Group Conference, Sep. 29, 2005, pp. 1-22.

* cited by examiner

*Primary Examiner* — Lucas Stelling
(74) *Attorney, Agent, or Firm* — Tumey L.L.P.

(57) ABSTRACT

A method for treating hydrogen sulfide in a solution includes providing the solution containing hydrogen sulfide. The method also includes adding sodium nitrite to the solution in an amount suitable to react with the hydrogen sulfide and treat the hydrogen sulfide.

14 Claims, No Drawings

SODIUM NITRITE OXIDATION OF HYDROGEN SULFIDE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention relates to the field of chemical operations and more specifically to the field of decontamination of sour water by removing hydrogen sulfide.

2. Background of the Invention

There has been an increasing need to decontaminate storage tanks such as petroleum refinery storage tanks that contain large volumes of sour water. Such sour water typically contains hydrogen sulfide ($H_2S$). Conventional methods for treating sour water to destroy the $H_2S$ include using an oxidizing agent, which typically converts $H_2S$ to a variety of non hazardous sulfur compounds.

Conventional oxidizing agents include hydrogen peroxide, potassium permanganate, sodium persulfate, sodium hypochlorite, dimethyldodecylamine-N-oxide, and sodium perborate. Each of such conventional methods has drawbacks. For instance, hydrogen peroxide is typically dangerous because the reaction between $H_2O_2$ and $H_2S$ may be very exothermic, with the heat of reaction potentially causing a violent eruption of boiling water Drawbacks to potassium permanganate include that the product of reaction with $H_2S$ may be solid manganese dioxide, which is a solid and may add to sludge accumulation in the tank. Further drawbacks to potassium permanganate include that the manganese dioxide may accumulate in a tank in the presence of organics, which may lead to combustion. Drawbacks to sodium persulfate include that the reaction with $H_2S$ may be very exothermic and also that its addition to a sulfide-laden water may result in an exotherm, which may cause a rapid rise in temperature. Drawbacks to sodium hypochlorite include that its use may release toxic chlorine gas. Drawbacks to dimethyldodecylamine-N-oxide include that its use may be impractical as it may be added in large quantities to sufficiently destroy the $H_2S$ in large volumes of sour water. Drawbacks to sodium perborate include the amounts typically used to sufficiently destroy the $H_2S$ may be impractical.

Consequently, there is a need for an improved method for treating $H_2S$ in sour water.

BRIEF SUMMARY OF SOME OF THE PREFERRED EMBODIMENTS

These and other needs in the art are addressed in one embodiment by a method for treating hydrogen sulfide in a solution. The method includes providing the solution that contains hydrogen sulfide. The method also includes adding sodium nitrite to the solution in an amount suitable to react with the hydrogen sulfide and treat the hydrogen sulfide. In some embodiments, an ammonia-removal gas is used to remove produced ammonia. In other embodiments, the method also includes adding a pH buffer (i.e., buffering agent), as needed, to maintain a neutral pH.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

DETAILED DESCRIPTION OF THE PREFERRED EMBODIMENTS

In an embodiment, sodium nitrite is added to a solution containing hydrogen sulfide and reacted with the hydrogen sulfide. The hydrogen sulfide may be present in any concentration in the solution. In embodiments, the hydrogen sulfide is present in high concentrations. In some embodiments, a high concentration of $H_2S$ is up to about 25,000 mg/liter in the solution. In other embodiments, a high concentration of $H_2S$ is from about 2,000 mg/liter to about 25,000 mg/liter $H_2S$ in the solution, alternatively from about 5,000 mg/liter to about 25,000 mg/liter of $H_2S$ in the solution, and alternatively from about 10,000 mg/liter to about 25,000 mg/liter in the solution.

The sodium nitrite may be added at any desired mole or weight ratio to hydrogen sulfide sufficient to treat the hydrogen sulfide in the solution. To treat the hydrogen sulfide comprises destroying (i.e., removing) the hydrogen sulfide in the solution. In an embodiment, the sodium nitrite is added at a mole ratio to $H_2S$ from about 1:3 to about 2:3 to treat the hydrogen sulfide. In some embodiments, the sodium nitrite is added at a weight ratio to $H_2S$ from about 0.676:1 to about 5.0:1, alternatively from about 0.676:1 to about 1.353:1 to treat the hydrogen sulfide.

It has been discovered that the following Equations (1) and (2), respectively, occur when sodium nitrite is added to a solution containing hydrogen sulfide to treat the hydrogen sulfide.

$$NaNO_2 + 3H_2S \rightarrow NH_3 + 3S^0 + NaOH + H_2O \quad (1)$$

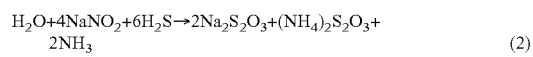

$$H_2O + 4NaNO_2 + 6H_2S \rightarrow 2Na_2S_2O_3 + (NH_4)_2S_2O_3 + 2NH_3 \quad (2)$$

In an embodiment, a pH buffer is added to the solution. In some embodiments, the pH buffer is added to reduce the pH of the solution to between about 7.0 and about 9.0, alternatively to between about 7.0 and about 8.5, further alternatively to between about 7.0 and about 8.0, and alternatively about 8.0. Without being limited by theory, the pH buffer is added in amounts to keep the pH level at or above 7.0 because sodium nitrite may decompose to generate nitric oxides at pH values less than 7.0. Further, without limitation, $H_2S$ may be liberated in some instances when large pH buffer amounts are added. The pH buffer may include any acidic buffering chemical suitable for providing a stable pH in the neutral range. In an embodiment, the pH buffer includes citric acid, phosphoric acid, boric acid, or any combination thereof. In some embodiments, the pH buffer includes citric acid, phosphoric acid, or any combination thereof. In alternative embodiments, the pH buffer is phosphoric acid.

It is to be understood that the reaction of sodium nitrite with the sulfide ion initially results in the destruction of sulfide with the production of elemental sulfur, thiosulfate, and ammonia, as shown by Equations (1) and (2). Without being limited by theory, the $NH_3$ and $S^0$ products enter a reverse reaction that reverts a portion of the product sulfur back through a polysulfide stage ($S_x^=$) and then back to the sulfide ion ($S^=$). Further, without being limited by theory, such reverse reaction may prevent or hinder the complete disappearance of the sulfide ion. Consequently, the pH buffer is added to reduce the pH levels to a desired range, which removes the free ammonia and makes it present only as an ammonium salt.

The reactions of Equations (1) and (2) may proceed at any temperature between about ambient temperature and about boiling temperature of the solution. In an embodiment, the reactions occur between about 40° C. and about 70° C., alternatively between about 40° C. and about 50° C.

In alternative embodiments, an ammonia-removal gas is blown onto the solution. The ammonia-removal gas is blown to remove the ammonia. The ammonia-removal gas may be blown by any desired method. In an embodiment, the ammonia-removal gas is blown by a compressor. For instance, the solution may be disposed in a tank, and the sodium nitrite is added. The ammonia-removal gas may be blown into the tank to remove the ammonia. In some embodiments, the ammonia-removal gas is blown in addition to the pH buffer addition. In alternative embodiments, the ammonia-removal gas is blown in place of the pH buffer addition. The ammonia-removal gas may include any gas suitable for being blown and exposed to ammonia. In an embodiment, the ammonia-removal gas is air and/or nitrogen.

To further illustrate various illustrative embodiments of the present invention, the following examples are provided.

EXAMPLES

Direct potentiometric sensing of [$S^=$] at a $Ag_2S$ electrode was conducted. A calibration curve was prepared from a series of sulfide standards at concentrations $10^0$, $10^{-1}$, $10^{-2}$, $10^{-3}$, and $10^{-4}$ M/L, with each buffered 1:1 (by volume) with a sulfide anti-oxidant buffer. Data for a standard curve of Emf vs. log [$S^=$] were taken daily, and standard curves were calculated daily by linear regression analysis.

Two experiments were conducted on a sample of water that had been analyzed to contain 17,000 mg/L $S^=$. Solid $NaNO_2$ was weighed into 50 ml samples, and the tests were conducted in capped bottles with the sample and reaction products completely contained therein. Such conditions were to approximate conditions within a tank during chemical treatment. All analysis samples were treated with a sulfide anti-oxidant buffer (SAOB), which is a highly caustic buffer.

First Experiment

In one sample, the reaction was carried out at 40° C. The sample volume was 50 mls. 0.353 mole/L (1.219 g/50 mls) $NaNO_2$ was added. $S^=$ was initially present at 0.530 mole/L. The initial pH was 9.5. The results from the experiment are indicated in Table I.

TABLE I

| Reaction Time in Hours | [$S^=$], mg/L |
|---|---|
| 0 | 16,541 |
| 2 | 4,422 |
| 4 | 716 |
| 6 | 64-358 |
| 8 | 96-199 |
| 12 | 6-139 |
| 24 | 61-105 |

In another sample, the reaction was carried out at 50° C. The sample volume was 50 mls. 0.353 mole/L (1.219 g/50 mls) $NaNO_2$ was added. $S^=$ was initially present at 0.530 mole/L. The initial pH was 9.5. The results from the experiment are indicated in Table II.

TABLE II

| Reaction Time in Hours | [$S^=$], mg/L |
|---|---|
| 0 | 16,541 |
| 2 | 694 |
| 4 | 218 |
| 6 | 25-158 |
| 8 | 40-103 |
| 12 | 15-34 |
| 24 | 5-6 |

There was a strong presence of ammonia in the samples after onset of the reaction. The final pH of the samples was measured at a pH of 10.3. To reduce the pH, a second experiment was conducted.

Second Experiment

The second experiment included periodic pH buffering and was carried out at 45° C. The sample volume was 50 mls. 0.260 mole/L (0.897 g/50 mls) $NaNO_2$ was added. $S^=$ was initially present at 0.390 mole/L. Citric acid was added as a 50% concentrate with a specific gravity of 1.166.

Only the $NaNO_2$ was first added, and the initially fast reaction was allowed to proceed unbuffered for two hours. After the two hour period, 50% citric acid was added, which lowered the pH to about 8.1. The citric acid addition was repeated periodically during the reaction. The results are shown in Table III below. The two hour addition resulted in significantly lowering the $S^=$ in the sample from 3,200 mg/L to 180 mg/L. It was seen that maintaining the pH at about 8.0 allowed the process of sulfide treatment (destruction) to proceed to completion.

TABLE III

| Reaction Time in Hours | 50% Citric Acid Added | [$S^=$], mg/L |
|---|---|---|
| 0 | None | 12,501 |
| 1 | None | 7,349 |
| 2 | 3.0 mls (3.5 g) | 3,197 |
| 3 | 1.5 mls (1.71 g) | 178 |
| 5 | 0.42 mls (0.48 g) | 18 |
| 6 | None | 2 |
| 7 | None | 0.04 |

Although the present invention and its advantages have been described in detail, it should be understood that various changes, substitutions and alterations may be made herein without departing from the spirit and scope of the invention as defined by the appended claims.

What is claimed is:

1. A method for removing hydrogen sulfide from water, wherein the water comprises hydrogen sulfide, comprising:
    adding sodium nitrite to the water in an amount suitable to react with the hydrogen sulfide in the water and remove hydrogen sulfide from the water; and
    adding a pH buffer periodically to the water to maintain the pH of the water between about 7.0 to about 9.0 and to remove free ammonia from the water.

2. The method of claim 1, wherein the water comprises from about 2,000 mg/liter to about 25,000 mg/liter hydrogen sulfide.

3. The method of claim 1, wherein the water comprises from about 5,000 mg/liter to about 25,000 mg/liter hydrogen sulfide.

4. The method of claim 1, wherein the water comprises from about 10,000 mg/liter to about 25,000 mg/liter hydrogen sulfide.

5. The method of claim 1, wherein the sodium nitrite is added at a weight ratio to hydrogen sulfide from about 0.676:1 to about 5.0:1.

6. The method of claim 1, wherein the sodium nitrite is added at a weight ratio to hydrogen sulfide from about 0.676:1 to about 1.353:1.

7. The method of claim 1, wherein the pH buffer comprises an acidic buffering chemical.

8. The method of claim 1, wherein the pH buffer comprises citric acid, phosphoric acid, boric acid, or any combinations thereof.

9. The method of claim 1, wherein the pH buffer comprises citric acid, phosphoric acid, or any combinations thereof.

10. The method of claim 1, wherein the pH buffer comprises phosphoric acid.

11. The method of claim 1, wherein the reaction between the sodium nitrite and the hydrogen sulfide is carried out at between about 40° C. and about 70° C.

12. The method of claim 1, wherein the reaction between the sodium nitrite and the hydrogen sulfide is carried out at between about 40° C. and about 50° C.

13. The method of claim 1, wherein the reaction between the sodium nitrite and the hydrogen sulfide produces ammonia, the method further comprises blowing an ammonia-removal gas to remove the produced ammonia.

14. The method of claim 13, wherein the ammonia-removal gas is blown by a compressor.

* * * * *